Sept. 28, 1965   D. ALLEN   3,208,327
INSTANT PIANO PICTURE CHORD COURSE

Filed Jan. 6, 1964   5 Sheets-Sheet 1

INVENTOR.
Dayton Allen
BY
Polachek & Saulsbury
ATTORNEYS.

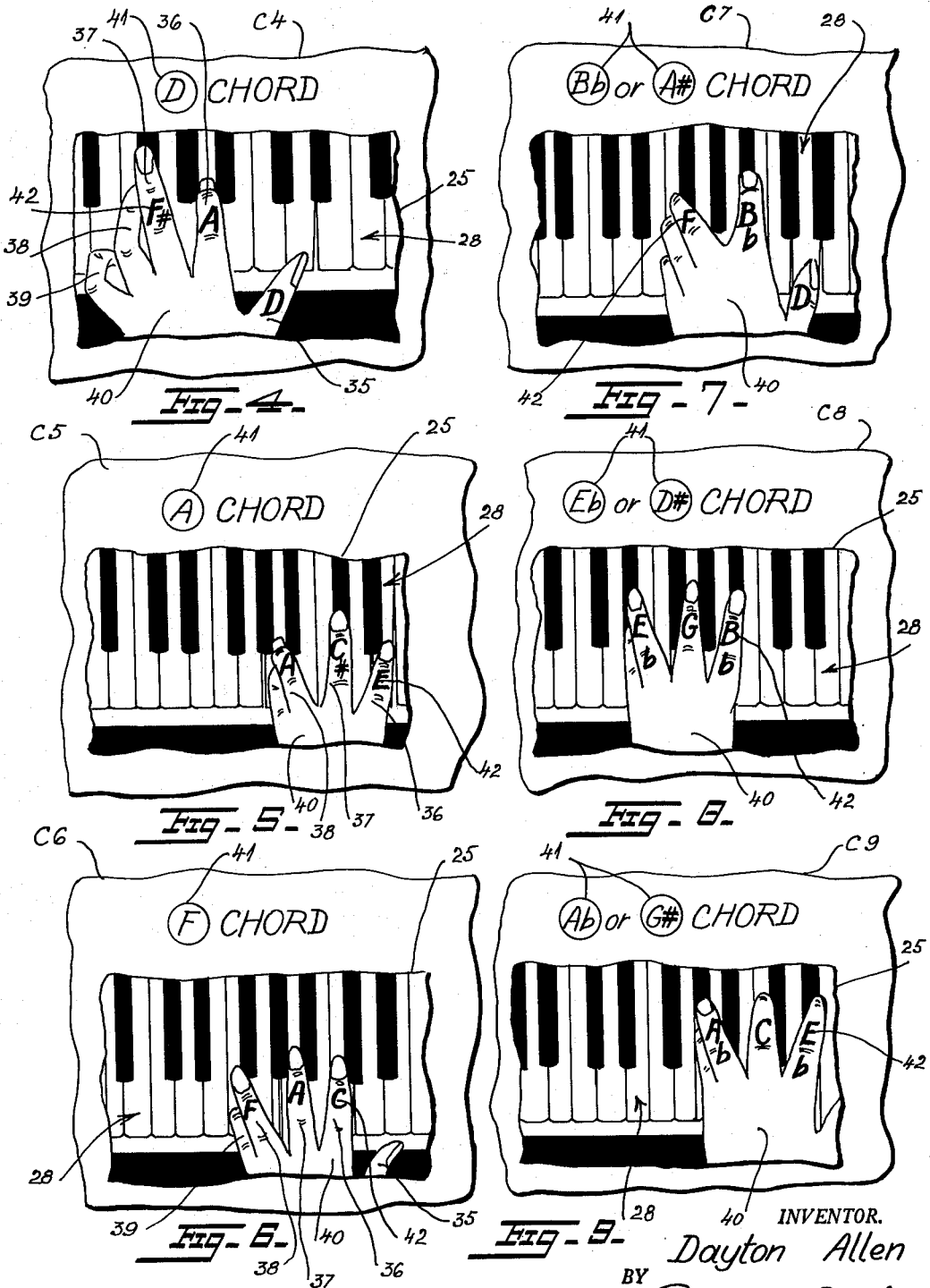

Sept. 28, 1965            D. ALLEN            3,208,327

INSTANT PIANO PICTURE CHORD COURSE

Filed Jan. 6, 1964            5 Sheets-Sheet 3

INVENTOR.
Dayton Allen
BY Polachek & Saulsbury
ATTORNEYS.

Sept. 28, 1965      D. ALLEN      3,208,327
INSTANT PIANO PICTURE CHORD COURSE
Filed Jan. 6, 1964      5 Sheets-Sheet 4
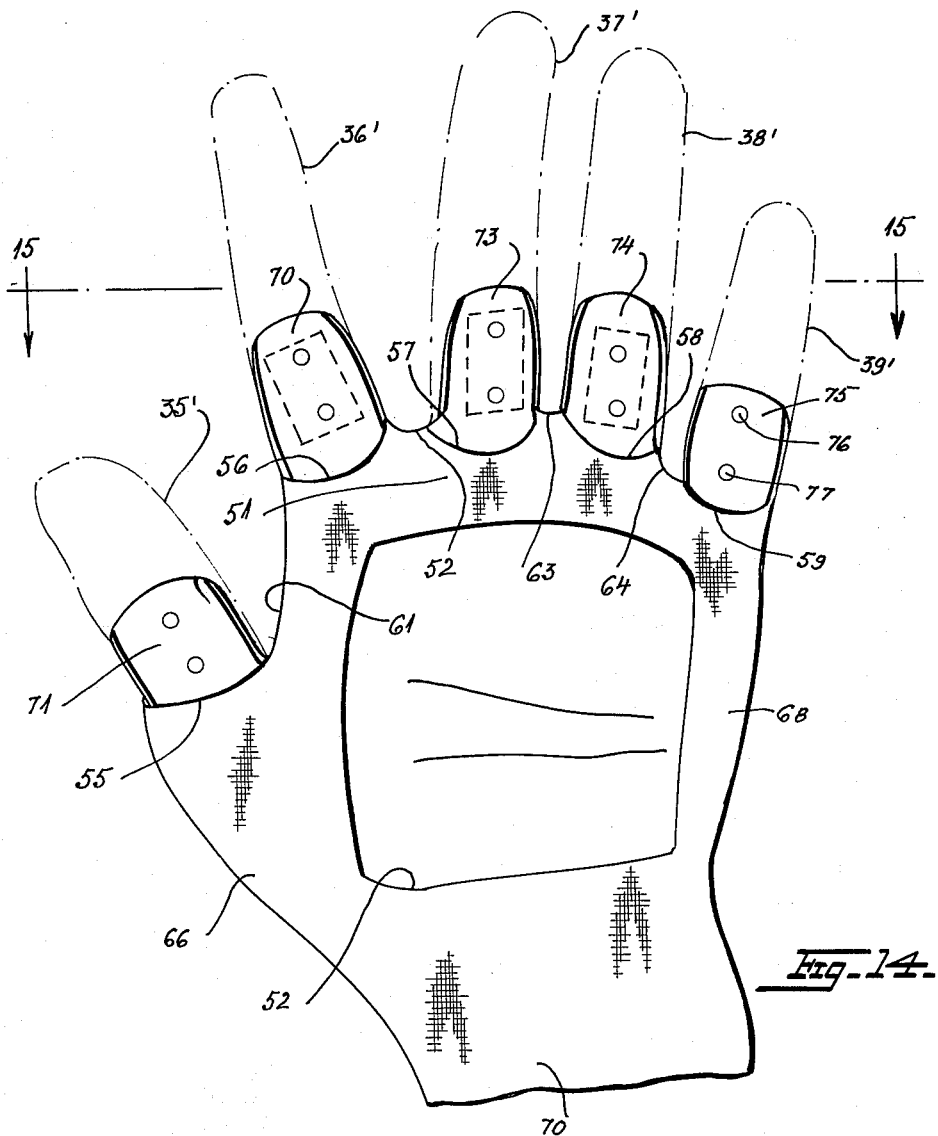
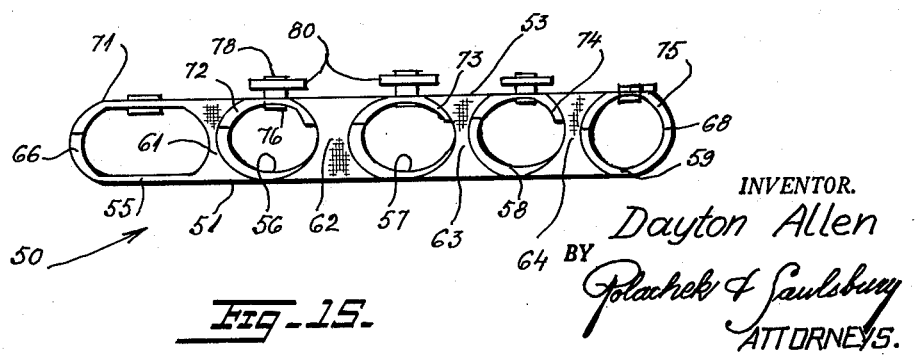
INVENTOR.
Dayton Allen

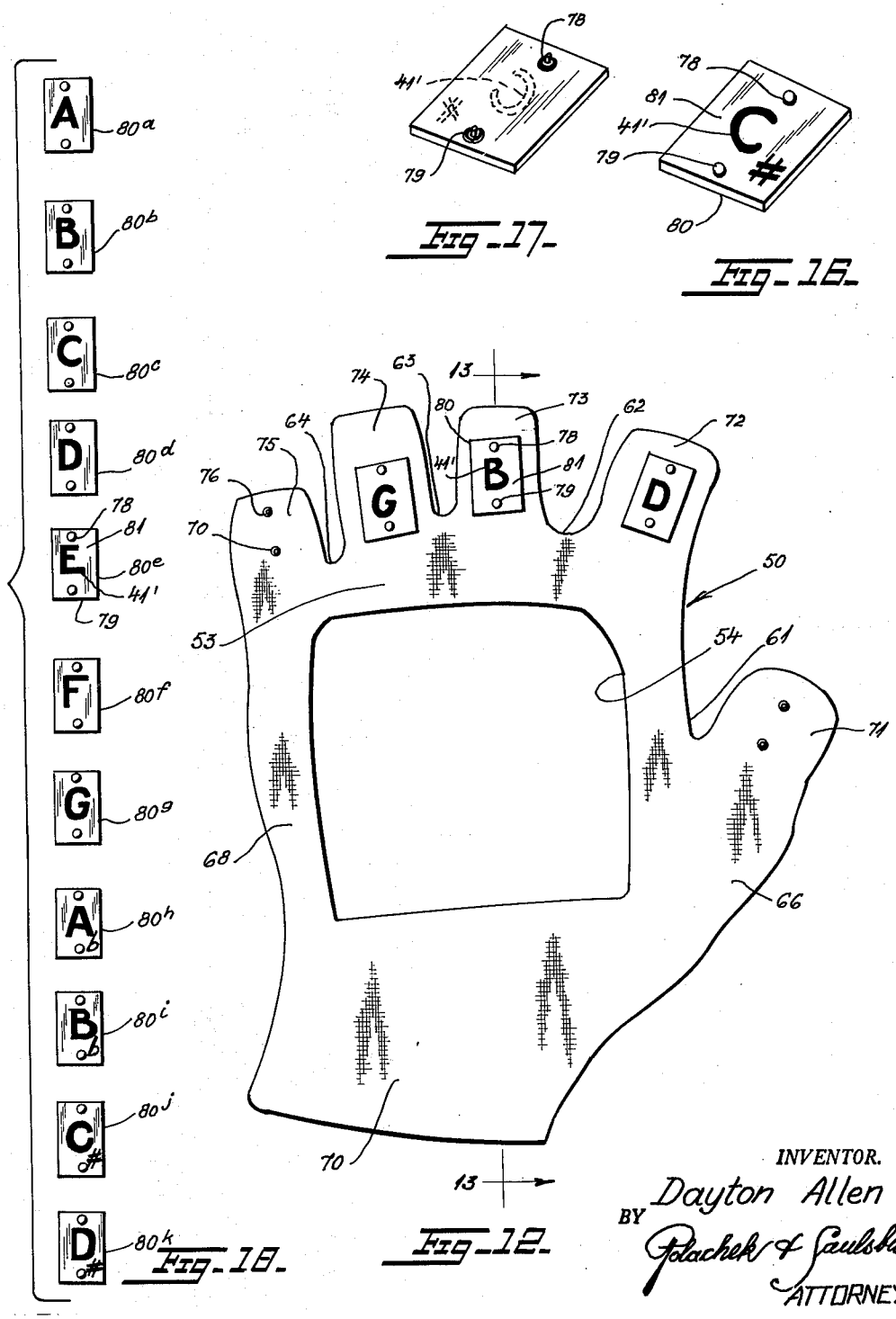

United States Patent Office 3,208,327
Patented Sept. 28, 1965

3,208,327
INSTANT PIANO PICTURE CHORD COURSE
Dayton Allen, 956 Dobbs Ferry Road, White Plains, N.Y.
Filed Jan. 6, 1964, Ser. No. 335,888
14 Claims. (Cl. 84—471)

This invention relates to the art of educational devices and methods and more particularly concerns a new and improved method and means for teaching piano playing.

According to the invention a student is provided with a set of charts on each of which is depicted either by a photograph or drawing the particular keys of a piano involved in playing a specified chord, the fingers of the left hand which are to play the chord, the correct playing positions of the fingers, and the musical notation of each of the particular keys. These charts serve as guides to a student in playing a piece having designated chords, or in practicing the playing of the various chords. In addition, according to the invention, the player is provided with a fingerless glove to be worn on one hand while playing chords. On the glove at finger openings therein may be removably attached various lettered tabs. The letters on the tabs correspond to the notes the various chords on the charts. The letters on the tabs include all notes of a chromatic scale, including sharps and flats. The glove is so constructed that it does not interfere with free finger movements but does provide the student with a clear view of the letters on the tabs. Thus, the student can play any particular chord until it is committed to memory. The student can change the tabs to correspond to each of the chords on the charts. The glove is provided with fasteners at the finger openings so that any number of tabs can be applied for chords having three, four or five notes. By use of the charts, glove and tabs, the playing of music chords is quickly learned.

It is therefore one object of the invention to provide a novel method of learning music chords.

It is another object of the invention to provide a method of learning to play the piano including the use of charts having illustrations of particular piano keys involved in various chords, of fingers of the hand in proper positions for playing the chords, and of musical notation or letters of the notes in the chords.

A further object is to provide a fingerless glove with fasteners at finger openings in the glove to which lettered tabs may be removably attached, the letters corresponding to the notes of a selected chord to be played by particular fingers of the player's hand.

For further comprehension of the invention, and of the objects and advantages thereof, reference will be had to the following description and accompanying drawings, and to the appended claims in which the various novel features of the invention are more particularly set forth.

In the accompanying drawings forming a material part of this disclosure:

FIGS. 1–9 are charts used in the piano playing method according to the invention.

FIG. 12 is an enlarged rear elevational view of the glove, with attached tabs.

FIG. 14 is a front elevational view of the glove of FIG. 12.

FIG. 15 is a top end view of the glove taken on line 15—15 of FIG. 14.

FIG. 16 is a perspective view of a tab showing the lettered side.

FIG. 17 is a perspective view of a tab showing the reverse side.

FIG. 18 are plan views of a number of lettered tabs.

Figure 1:
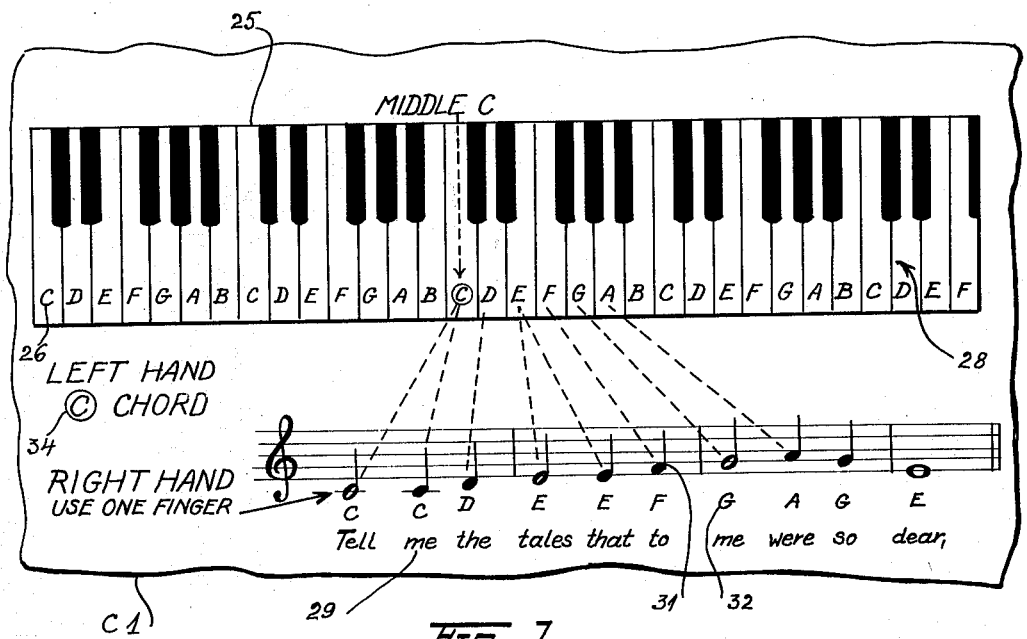

In FIG. 1 is shown chart C1, which may be supplied to a player for reference and instruction purposes. The chart has imprinted part of a piano keyboard 25 with letters 26 corresponding to the white keys 28 of the piano keyboard. The words 29 of a melody to be played by the right hand appear below notes 31 on a major clef 30. The notes are indicated by letters 32 corresponding to the lettered keys 28 on the keyboard 25. The appropriate chord to be played by the left hand is indicated by the circled chord designation 34. In this instance it will be noted that the "C" chord is designated.

Figure 2:
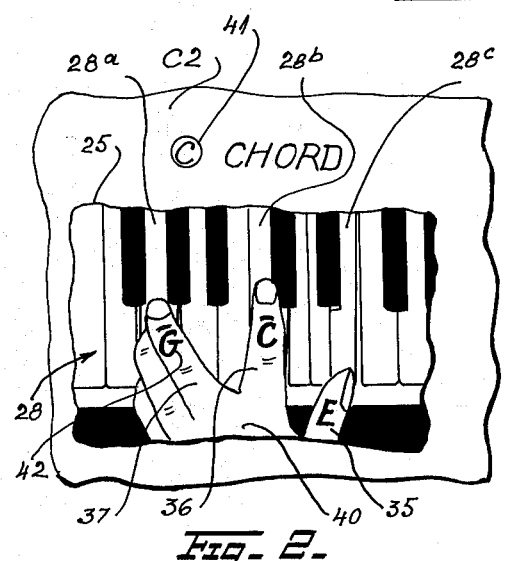

FIG. 2 shows part of a chart C2 which is one of a group of charts supplied to the player. The charts may be on separate cards or may be bound in a book. Chart C2 shows as an illustration or photograph part of keyboard 25 with the "G," "C" and "E" piano keys 28ª, 28ᵇ and 28ᶜ which comprise the "C" chord pointed out by an illustration or photograph of the thumb 35, first finger 36 and second finger 37 of a player's hand 40. The fingers are shown in correct playing positions for playing the "C" chord and the chord designation 41 appears on the chart. Notes 42 of the chord are marked on the fingers.

Figure 3:
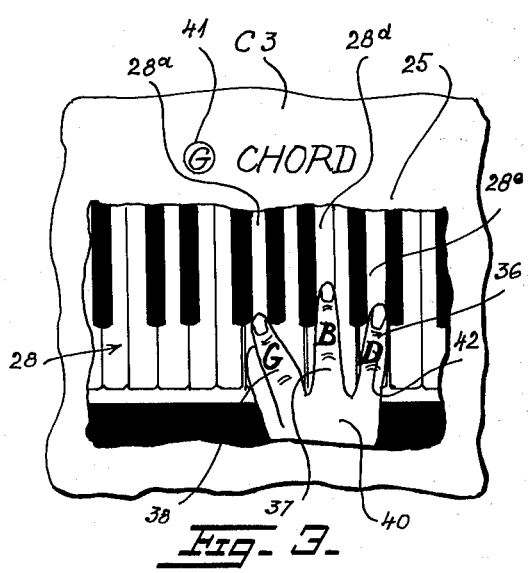
Figure 10:
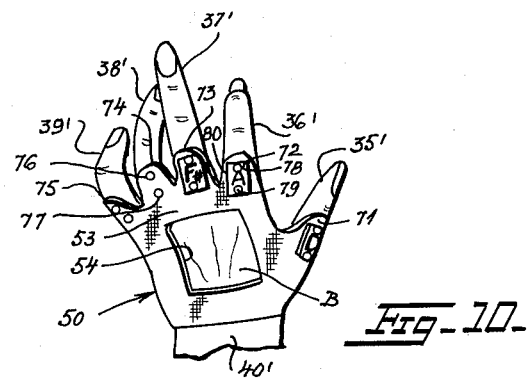
FIG. 10 is a rear oblique view and FIG. 11 is a front oblique view, of a glove and tabs embodying the invention, shown worn on a player's hand.
Figure 11:
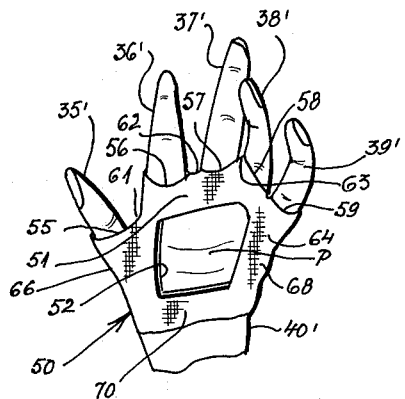
Figure 13:
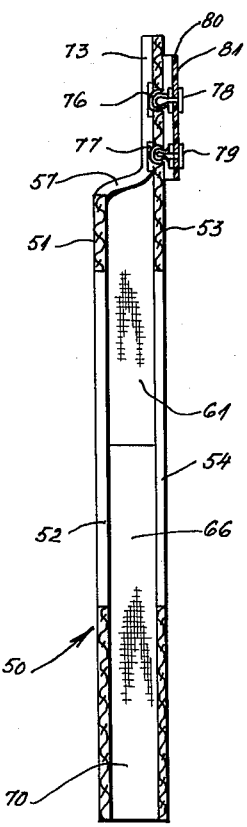
FIG. 13 is a sectional view taken on line 13—13 of FIG. 12.

FIG. 3 shows part of a chart C3 in which is a picture of a player's hand 40 at keyboard 25. The picture shows first finger 36, second finger 37 and third finger 38 pointing out the "G," "B" and "D" piano keys 28ª, 28ᵈ and 28ᵉ which are played to produced the "G" chord whose designation 41 appears on the chart. Notes 42 of the chord are marked on the fingers 36, 37, 38.

In FIGS. 4–9 are shown other charts C4–C9 each similar to charts C2 and C3 in that the fingers 35–39 of the player's hand 40 point out the particular piano keys 28 to be played on the keyboard 25 to produce the chord 41 designated on the chart. Charts C4–C9 illustrate the piano keys, notation, playing fingers and finger positions for chord "D," "A," "F," "B flat or A#," "E flat or D#" and "A flat or G#," respectively.

Although only eight chord charts C2–C9 are illustrated in FIGS. 2–9, it will be understood that the student will be provided with as many chord charts as his piano study course requires. The student should be provided with charts similar to charts C2–C9 for at least the following chords:

Major chords: C, G, D, A, F, A#, D#, G#, E, B, C#, F#.

Minor chords: Cm, Gm, Fm, A#m, Dm, Am, Em, Bm, D#m, G#m, C#m, F#m.

Seventh chords: C7, G7, D7, A7, F7, A#7, D#7, G#7, E7, B7, C#7, F#7.

Augmented chords: C, G, F, A#, D, A, E, B, D#, G#, C#, F#.

Diminished chords: Cdim, Fdim, Gdim.

FIGS. 10 to 15 show a glove 50 which can be used in conjunction with the charts of FIGS. 1–9. The glove is a frame-like structure made of a light, flexible cloth or plastic material. It has a narrow elongated from panel 51 and back panel 53 to overlay the palm P and back B of the hand 40′ of the piano player. The glove is fingerless so as not to interfere with bending movements of the fingers 35′–39′ of the hand 40. The glove shown is especially intended for use on the left hand but it can also be made up in a right hand structure which will be a mirror image of the left hand glove illustrated. The glove has openings 55–59 defined by webs 61–64 and the outer opposing end webs 66, 68. End webs 66, 68 at the thumb 35′ and little finger 39′ extend down to and join a wrist band 70.

Large openings 52, 54 are defined between the wrist band 70, end webs 66, 68 and panels 51, 53 to expose major portions of the palm P and back B of the hand and to permit free flexing thereof during playing.

Generally rectangular extensions 71–75 are provided at the back panel 53 which partially overlay the backs of the fingers at the knuckles. These extensions are cut away at the front so that they do not in any way interfere with forward flexing of the fingers at the knuckles. The panel extensions are each provided with two spaced snap fastener elements 76, 77 to which mating snap fastener elements 78, 79 of rectangular tabs 80 can be detachably and nonrotatably engaged.

The tabs 80 as shown in FIGS. 10, 12, 13, 15–18 are flexible members made of cloth or plastic material. On the outer face 81 of each tab is a note symbol 41' corresponding to any one of the note letters appearing on the picture of the player's fingers shown in charts C2–C9. FIG. 18 shows tabs 80ª–80ᵏ each having a different note symbol 41' thereon. There may be twenty-one tabs in a complete set to include notes "A" through "G," "A#" through "G#" and "A flat" through "G flat," although the number may be reduced somewhat since some notes are musically equivalent. For example, "G flat" is the same as "F," "C flat" is the same as "B," etc.

The glove 50 may be molded in one piece out of plastic material or may be knitted in one piece. Alternatively, it can be made from a cloth blank having edges sewn together to form the several openings. In general, it is preferred that the glove have a seamless construction and that the material be elastic so as to be substantially weightless on the hand and provide no interference with playing. If the glove is made of absorbent fabric it may serve to absorb moisture from the hand which would be an additional advantage dervied from its use during playing.

To use the glove, the player will select those tabs having notations 41' corresponding to notations 41 appearing on fingers 35–39 of one of chord charts C2–C9. The player will attach the tabs 80 to the panel extensions 71–75 at the fingerholes corresponding to the fingers 35–39 shown on the selected chord chart. Thus, on fingers 35'–39' of the player the same tabs 80 will appear as those shown on the picture of the player's fingers 35–39 shown in the selected chord chart.

By reference to chart C1 of the selected musical piece to be played and by reference to the appropriate chord chart the player will have before him a guide to the particular piano keys to be used for playing the melody by the right hand and playing the chord designated on chart C1 by the left hand.

The player can practice playing a chord while wearing the glove 50 until he is familiar with that chord. Then the player can change the tabs 80 to learn to play another chord as instructed by one of charts C2–C9. In this way, by repeatedly replacing the tabs, the player will quickly learn the notes of the chords, the fingers to use, the correct finger positions, and the correct piano keys to be played.

It will be apparent that the invention thus involves a novel, improved quick method of learning to play the piano, of learning chords, and of learning to read music. The invention further involves use of charts providing guides to the learning of pieces, chords, etc. The invention additionally involves use of memory or teaching aids in the form of frame-like gloves to which lettered tabs may be applied to coordinate with the showing of chords, hand positions, notes and keys on the charts.

While I have illustrated and described the preferred embodiments of my invention, it is to be understood that I do not limit myself to the precise constructions herein disclosed and that various changes and modifications may be made within the scope of the invention as defined in the appended claims.

Having thus described my invention, what I claim as new, and desire to secure by United States Letters Patent is:

1. A music instruction device, comprising a frame-like fingerless glove including a pair of narrow elongated front and back panels to overlay respectively the palm and back of the hand of a piano player, end webs integral with and joining opposite ends of the narrow panels, a plurality of other webs integral with and connecting one lateral edge of the front panel to one lateral edge of the back panel and defining five laterally spaced fingerholes through which respective individual fingers of the player's hand can extend, and fastener elements at the webs adjacent to the fingerholes for detachably and nonrotatably engaging tabs bearing chord notations in view of the player at the back of the player's hand.

2. A music instruction device, comprising a frame-like fingerless glove including a pair of narrow elongated front and back panels to overlay respectively the palm and back of the hand of a piano player, end webs integral with and joining opposite ends of the narrow panels, a plurality of other webs integral with and joining one edge of the front panel to one edge of the back panel and defining five laterally spaced fingerholes through which respective individual fingers of the player's hand can extend, said back panel having generally rectangular extensions at said fingerholes respectively extending outwardly of said one edge of the back panel, and fastener elements on the extensions for detachably and nonrotatably engaging tabs bearing chord notations in view of the player at the back of the player's hand.

3. A music instruction device, comprising a frame-like fingerless glove including a pair of narrow elongated front and back panels to overlay respectively the palm and back of the hand of a piano player, end webs integral with and joining opposite ends of the narrow panels, a plurality of other webs integral with and connecting one lateral edge of the front panel to one lateral edge of the back panel and defining five laterally spaced fingerholes through which respective individual fingers of the player's hand can extend, and first fastener elements at the webs adjacent to the fingerholes; and a plurality of tabs each having a chord notation thereon, and other fastener elements on the tabs selectively detachably and nonrotatably engageable with the first fastener elements for displaying the chord notations in view of the player at the back of the player's hand.

4. A music instruction device, comprising a frame-like fingerless glove including a pair of narrow elongated front and back panels to overlay respectively the palm and back of the hand of a piano player, end webs integral with and joining opposite ends of the narrow panels, a plurality of other webs integral with and joining one edge of the front panel to one edge of the back panel and defining five laterally spaced fingerholes through which respective individual fingers of the player's hand can extend, said back panel having generally rectangular extensions at said fingerholes respectively extending outwardly of said one edge of the back panel, and first fastener elements on the extensions; and a plurality of tabs each having a chord notation thereon, and other fastener elements on the tabs selectively detachably and nonrotatably engageable with the first fastener elements for displaying the chord notations in view of the player at the back of the player's hand.

5. A music instruction device, comprising a frame-like fingerless glove including a pair of narrow elongated front and back panels to overlay respectively the palm and back of the hand of a piano player, end webs integral with and joining opposite ends of the narrow panels, a plurality of other webs integral with and connecting one lateral edge of the front panel to one lateral edge of the back panel and defining five laterally spaced fingerholes through which respective individual fingers of the player's hand can extend, said end webs extending beyond the other lateral edges of the front panels, an annular wrist band integral with and joining said end webs remote from the front and back panels and defining large openings with said end webs and panels at the palm and back of the hand of the player, and fastener elements at the webs adjacent to the fingerholes for detachably and nonrotatably engaging tabs bearing chord notations in view of the player at the back of the player's hand.

6. A music instruction device, comprising a frame-like fingerless glove including a pair of narrow elongated front and back panels to overlay respectively the palm and back of the hand of a piano player, end webs integral with and joining opposite ends of the narrow panels, a plurality of other webs integral with and joining one edge of the front panel to one edge of the back and defining five laterally spaced fingerholes through which respective individual fingers of the player's hand can extend, said back panel having generally rectangular extensions at said fingerholes respectively extending outwardly of said one edge of the back panel, said end webs extending beyond the other lateral edges of the front panels, an annular wrist band integral with and joining said end webs remote from the front and back panels and defining large openings with said end webs and panels at the palm and back of the hand of the player, and fastener elements on the extensions for detachably and nonrotatably engaging tabs bearing chord notations in view of the player at the back of the player's hand.

7. A music instruction device, comprising a frame-like fingerless glove including a pair of narrow elongated front and back panels to overlay respectively the palm and back of the hand of a piano player, end webs integral with the joining opposite ends of the narrow panels, a plurality of other webs integral with and connecting one lateral edge of the front panel to one lateral edge of the back panel and defining five laterally spaced fingerholes through which respective individual fingers of the player's hand can extend, said end webs extending beyond the other lateral edges of the front panels, an annular wrist band integral with and joining said end webs remote from the front and back panels and defining large openings with said end webs and panels at the palm and back of the hand of the player, and first fastener elements at the webs adjacent to the fingerholes; and a plurality of tabs each having a chord notation thereon, and other fastener elements on the tabs selectively detachably and nonrotatably engageable with the first fastener elements for displaying the chord notations in view of the player at the back of the player's hand.

8. A music instruction device, comprising a frame-like fingerless glove including a pair of narrow elongated front and back panels to overlay respectively the palm and back of the hand of a piano player, end webs integral with and joining opposite ends of the narrow panels, a plurality of other webs integral with and joining one edge of the front panel to one edge of the back panel and defining five laterally spaced fingerholes through which respective individual fingers of the player's hand can extend, said back panel having generally rectangular extensions at said fingerholes respectively extending outwardly of said one edge of the back panel, said end webs extending beyond the other lateral edges of the front panels, an annular wrist band integral with and joining said end webs remote from the front and back panels and defining large openings with said end webs and panels at the palm and back of the hand of the player, and first fastener elements on the extensions; and a plurality of tabs each having a chord notation thereon, and other fastener elements on the tabs selectively detachably and nonrotatably engageable with the first fastener elements for displaying the chord notations in view of the player at the back of the player's hand.

9. A piano teaching course, comprising a plurality of charts, each of said charts having an illustration thereon including part of a piano keyboard, a chord designation, a representation of the fingers of a player's hand disposed in position on particular keys of the keyboard for playing said chord, and a note designation on each finger, whereby a student is instructed in playing said chord on the piano.

10. A piano teaching course, comprising a plurality of charts, each of said charts having an illustration thereon including part of a piano keyboard, a chord designation, a representation of the fingers of a player's hand disposed in position on particular keys of the keyboard for playing said chord, and a note designation on each finger, whereby a student is instructed in playing said chord on the piano; and a music instruction device for use in coordination with said charts, said device comprising a frame-like fingerless glove including a pair of narrow elongated front and back panels to overlay respectively the palm and back of the hand of a piano player, end webs integral with and joining opposite ends of the narrow panels, a plurality of other webs integral with and connecting one lateral edge of the front panel to one lateral edge of the back panel and defining five laterally spaced fingerholes through which respective individual fingers of the player's hand can extend, and fastener elements at the webs adjacent to the fingerholes for detachably and nonrotatably engaging tabs bearing chord notations in view of the player at the back of the player's hand.

11. A piano teaching course, comprising a plurality of charts, each of said charts having an illustration thereon including part of a piano keyboard, a chord designation, a respesentation of the fingers of a player's hand disposed in position on particular keys of the keyboard for playing said chord, and a not designation on each finger, whereby a student is instructed in playing said chord on the piano; and a music instruction device for use in coordination with said charts, said device comprising a frame-like fingerless glove including a pair of narrow elongated front and back panels to overlay respectively the palm and back of the hand of a piano player, end webs integral with and joining opposite ends of the narrow panels, a plurality of other webs integral with and joining one edge of the front panel to one edge of the back panel and defining five laterally spaced fingerholes through which respective individual fingers of the player's hand can extend, said back panel having generally rectangular extensions at said fingerholes respectively extending outwardly of said one edge of the back panel, and fastener elements on the extensions for detachably and nonrotatably engaging tabs bearing chord notations in view of the player at the back of the player's hand.

12. A piano teaching course, comprising a plurality of charts, each of said charts having an illustration thereon including part of a piano keyboard, a chord designation, a representation of the fingers of a player's hand disposed in position on particular keys of the keyboard for playing said chord, and a note designation on each finger, whereby a student is instructed in playing said chord on the piano; and a mustic instruction device for use in coordination with said charts, said device comprising a frame-like fingerless glove including a pair of narrow elongated front and back panels to overlay respectively the palm and back of the hand of a piano player, end webs integral with and joining opposite ends of the narrow panels, a plurality of other webs integral with and joining one edge of the front panel to one edge of the back panel and defining five laterally spaced fingerholes through which respective individual fingers of the player's hand can extend, said back panel having generally rectangular extensions at said fingerholes respectively extending outwardly of said one edge of the back panel, and first fastener elements on the extensions; and a plurality of tabs each having a chord notation thereon, and other fastener elements on the tabs selectively detachably and nonrotatably engagable with the first fastener elements for displaying the chord notations in view of the player at the back of the player's hand.

13. A piano teaching course, comprising a plurality of charts, each of said charts having an illustration thereon including part of a piano keyboard, a chord designation, a representation of the fingers of a player's hand disposed in position on particular keys of the keyboard for playing said chord, and a note designation on each finger, whereby a student is instructed in playing said chord on the piano; and a music instruction device for use in coordination with said charts, said device comprising a frame-like fingerless glove including a pair of narrow elongated front and back panels to overlay respectively the palm and back of the hand of a piano player, end webs integral with and joining opposite ends of the narrow panels, a plurality of other webs integral with and joining one edge of the front panel to one edge of the back panel and defining five laterally spaced fingerholes through which respective individual fingers of the player's hand can extend, said back panel having generally rectangular extensions at said finger-holes respectively extending outwardly of said one edge of the back panel, and first fastener elements on the extensions; and a plurality of tabs each having a chord notation thereon, and other fastener elements on the tabs selectively detachably and nonrotatably engageable with the first fastener elements for displaying the chord notations in view of the player at the back of the player's hand, said end webs extending beyond the other lateral edges of the front panels, an annular wrist band integral with and joining said end webs remote from the front and back panels and defining large openings with said end webs and panels at the palm and back of the hand of the player.

14. A piano teaching course, comprising a plurality of charts, each of said charts having an illustration thereon including part of a piano keyboard, a chord designation, a representation of the fingers of a player's hand disposed in position on particular keys of the keyboard for playing said chord, and a note designation on each finger, whereby a student is instructed in playing said chord on the piano; and a music instruction device for use in coordination with said charts, said device comprising a frame-like fingerless glove including a pair of narrow elongated front and back panels to overlay respectively the palm and back of the hand of a piano player, end webs integral with and joining opposite ends of the narrow panels, a plurality of other webs integral with and connecting one lateral edge of the front panel to one lateral edge of the back panel and defining five laterally spaced fingerholes through which respective individual fingers of the player's hand can extend, and first fastener elements at the webs adjacent to the fingerholes; and a plurality of tabs each having a chord notation thereon, and other fastener elements on the tabs selectively detachably and nonrotatably engageble with the first fastener elements for displaying the chord notations in view of the player at the back of the player's hand.

References Cited by the Examiner

UNITED STATES PATENTS

| 623,966 | 5/99 | Barkley | 35—5 |
| 1,053,366 | 2/13 | Dickson | 84—483 |
| 1,133,074 | 3/15 | Unschuld-Lazard | 84—470 |
| 2,053,874 | 9/36 | O'Donnell | 35—5 |
| 2,570,908 | 10/51 | Behr | 35—5 |
| 2,984,143 | 5/61 | McGinley | 84—471 |

LEO SMILOW, *Primary Examiner.*